United States Patent
Alexander et al.

(10) Patent No.: US 10,320,809 B1
(45) Date of Patent: Jun. 11, 2019

(54) DECOUPLING RENDERING ENGINE FROM WEB BROWSER FOR SECURITY

(71) Applicant: Spikes, Inc., Los Gatos, CA (US)

(72) Inventors: Scott Alexander, Los Gatos, CA (US); Branden Spikes, Los Gatos, CA (US)

(73) Assignee: Cyberinc Corporation, San Ramon, CA (US)

( * ) Notice: Subject to any disclaimer, the term of this patent is extended or adjusted under 35 U.S.C. 154(b) by 88 days.

(21) Appl. No.: 15/339,743

(22) Filed: Oct. 31, 2016

Related U.S. Application Data

(60) Provisional application No. 62/249,066, filed on Oct. 30, 2015.

(51) Int. Cl.
  *H04L 29/06* (2006.01)
  *H04L 29/08* (2006.01)

(52) U.S. Cl.
  CPC .............. *H04L 63/14* (2013.01); *H04L 67/02* (2013.01)

(58) Field of Classification Search
  CPC . H04L 63/1441; H04L 51/12; H04L 63/1425; H04L 63/14; H04L 67/02
  See application file for complete search history.

(56) References Cited

U.S. PATENT DOCUMENTS

| | | | | |
|---|---|---|---|---|
| 6,857,102 B1 * | 2/2005 | Bickmore | ........... | G06F 17/2247 707/E17.121 |
| 7,752,534 B2 * | 7/2010 | Blanchard, III | ........ | G06F 17/22 715/201 |
| 8,464,318 B1 * | 6/2013 | Hallak | ................ | H04L 63/1416 726/4 |
| 8,527,860 B1 * | 9/2013 | Colton | .............. | G06F 17/30893 709/203 |
| 8,683,596 B2 * | 3/2014 | Amit | ....................... | G06F 21/52 709/225 |
| 8,719,451 B1 * | 5/2014 | Colton | ................ | G06F 17/3089 709/248 |
| 8,752,183 B1 * | 6/2014 | Heiderich | ............. | G06F 21/577 726/22 |
| 8,819,539 B1 * | 8/2014 | Colton | .............. | G06F 17/30902 707/755 |
| 8,914,774 B1 * | 12/2014 | Colton | ................ | G06F 9/44578 709/203 |
| 8,949,990 B1 * | 2/2015 | Hsieh | .................... | G06F 21/577 726/22 |
| 9,208,235 B1 * | 12/2015 | Liu | ................... | G06F 17/30864 |

(Continued)

Primary Examiner — Beemnet W Dada
Assistant Examiner — Stephen T Gundry
(74) Attorney, Agent, or Firm — Wilson Sonsini Goodrich & Rosati

(57) ABSTRACT

Methods and systems for providing web content from a decoupled rendering engine to a visual display of an electronic device of a user are provided. A request for web browser content is received at a browser rendering engine server from a local web browser of an electronic device of a user. The browser rendering engine server is physically separate from the electronic device of the user. The requested web content is retrieved. Additionally, the requested web content is provided to a rendering engine that is isolated within a rendering engine container stored on the browser rendering engine server. The web content is rendered at rendering engine, thereby generating web content output from the rendering engine. Further, the web content output is provided to a viewing application on the electronic device of the user.

4 Claims, 7 Drawing Sheets

(56) References Cited

U.S. PATENT DOCUMENTS

| | | | |
|---|---|---|---|
| 9,241,004 B1* | 1/2016 | April | G06F 21/606 |
| 9,325,734 B1* | 4/2016 | Peacock | G06F 17/2247 |
| 9,391,832 B1* | 7/2016 | Song | H04L 29/14 |
| 9,414,095 B1* | 8/2016 | Corda | H04L 63/0428 |
| 9,477,836 B1* | 10/2016 | Ramam | G06F 21/6263 |
| 9,489,356 B2* | 11/2016 | Sheretov | G06F 17/30873 |
| 9,489,526 B1* | 11/2016 | Call | G06F 21/62 |
| 9,584,543 B2* | 2/2017 | Kaminsky | H04L 63/168 |
| 9,614,862 B2* | 4/2017 | Stern | H04L 63/1425 |
| 9,639,519 B1* | 5/2017 | Sebastian | G06F 17/30887 |
| 9,639,619 B2* | 5/2017 | Yao | G06F 17/30873 |
| 9,641,591 B1* | 5/2017 | Kolam | H04L 67/2823 |
| 9,924,235 B2* | 3/2018 | Ansari | H04N 21/482 |
| 2002/0198743 A1* | 12/2002 | Ariathurai | G06Q 30/02 705/4 |
| 2005/0132286 A1* | 6/2005 | Rohrabaugh | G06F 9/4443 715/239 |
| 2007/0016949 A1* | 1/2007 | Dunagan | G06F 21/51 726/22 |
| 2007/0174915 A1* | 7/2007 | Gribble | G06F 21/53 726/24 |
| 2008/0046562 A1* | 2/2008 | Butler | G06F 17/3089 709/224 |
| 2009/0063500 A1* | 3/2009 | Zhai | G06F 17/30896 |
| 2010/0333174 A1* | 12/2010 | Broerman | H04L 63/126 726/3 |
| 2011/0099629 A1* | 4/2011 | Boesgaard | G06F 21/31 726/22 |
| 2013/0111595 A1* | 5/2013 | Amit | G06F 21/52 726/25 |
| 2013/0340028 A1* | 12/2013 | Rajagopal | H04L 63/08 726/1 |
| 2014/0129920 A1* | 5/2014 | Sheretov | G06F 17/30873 715/234 |
| 2014/0258384 A1* | 9/2014 | Spikes | G06F 9/543 709/203 |
| 2014/0259171 A1* | 9/2014 | Spikes | H04L 63/1441 726/23 |
| 2017/0078732 A1* | 3/2017 | Ansari | H04N 21/482 |
| 2018/0020010 A1* | 1/2018 | Bhardwaj | H04L 63/08 |
| 2018/0048918 A1* | 2/2018 | Salinger | H04N 7/17318 |

* cited by examiner

DECOUPLING RENDERING ENGINE FROM WEB BROWSER FOR SECURITY

CROSS-REFERENCE TO RELATED APPLICATIONS

This application claims the benefit of U.S. Provisional Patent Application Ser. No. 62/249,066 entitled "Decoupling Rendering Engine from Web Browser for Security," filed Oct. 30, 2015, which is hereby incorporated by reference in its entirety.

BACKGROUND OF THE INVENTION

Individuals increasingly obtain information by accessing electronic content. However, the prevalence of malware within electronic communications has made it increasingly difficult to provide a secure environment for individuals to provide, share, and receive electronic content. In particular, electronic content that is accessed using a local web browser may infect an individual's computing device when the electronic content is infected with malware.

SUMMARY OF THE INVENTION

Methods and systems for decoupling a rendering engine from a web browser are provided. The web browser may display output of the rendering engine. By decoupling the rendering engine from the web browser, the rendering of unknown and/or untrusted software may be performed on a different computer than the computer that is running the web browser. In particular, the computer that is running the unknown and/or untrusted software may be physically separate from the computer that is running a corresponding web browser.

In examples, a web browser that does not contain a rendering engine may be provided on a computer. The computer may be a user's computer. Additionally, the web browser that is run on the user computer may include a viewer application that connects to and transmits the output of the rendering engine. The web browser may also receive user input that may then be transmitted from the local web browser to the rendering engine.

In further examples, a web browser that does contain a local rendering engine may use the local rendering engine to run a viewer application which, in turn, connects to and transmit the output of a remote rendering engine. The web browser that does contain a local rendering engine may additionally receive user input which may then be sent to the remote rendering engine.

In an aspect of the invention, a method for providing web content from a decoupled rendering engine to a visual display of an electronic device of a user is provided. The method comprises receiving, at a browser rendering engine server, a request for web browser content from a local web browser of an electronic device of a user, wherein the browser rendering engine server is physically separate from the electronic device of the user. The method also comprises retrieving the requested web content. Additionally, the method comprises providing the requested web content to a rendering engine that is isolated within a rendering engine container stored on the browser rendering engine server. Further, the method comprises rendering the web content at rendering engine, thereby generating web content output from the rendering engine. The method also comprises providing the web content output to a viewing application on the electronic device of the user, wherein the viewing application displays the web content on a display of the electronic device of the user.

In some embodiments, the viewing application runs within the local web browser of the electronic device. In some embodiments, the viewing application runs within a plug-in viewing application that is stored on the electronic device. Additionally, in some embodiments, the method further comprises receiving, at the browser rendering engine server, a second request for web browser content from a local web browser of an electronic device of a user, wherein the second request for web browser content is associated with a distinct tab within the local web browser; retrieving the requested web content; providing the requested web content to a second rendering engine that is isolated within a second rendering engine container stored on the browser rendering engine server; rendering the web content at the second rendering engine, thereby generating web content output from the second rendering engine; and providing the web content output from the second rendering engine to the viewing application on the electronic device of the user, wherein the viewing application displays the web content from the second rendering engine on the display of the electronic device of the user.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Methods and systems for decoupling a rendering engine from a web browser are provided. The rendering engine may be physically separate from the web browser. Additionally, portions of the web browser may be locally run on an endpoint device that is physically separate from a browser rendering engine server. For example, portions of a web browser interface may be locally stored and/or run on an endpoint device. Further, the web browser may display output of the rendering engine. By decoupling the rendering engine from the web browser, the rendering of unknown and/or untrusted software may be performed on a different computer that is physically separate from the endpoint device, such as a computer, that is running the web browser.

A user may use this system to run untrusted code from a source, such as the Internet, on a computer outside of a secure network. In particular, the untrusted code may be run on a remote rendering engine that is physically separate from the secure network. In this way, the system may be used to prevent malware from having direct access to computers in the secure network. Additionally, the remote rendering engine may be run in an environment that is more secure than the user's endpoint device. In this example, users may prefer to interact with sensitive websites, such as banking websites, in the more secure web browser that is being run on the rendering engine rather than on a web browser that is run on the user's local computer. Further, the remote rendering engine may be run in an environment that is built to efficiently run certain programs within the remote rendering engine. In particular, the remote rendering engine may be designed to include characteristics that optimize the running of certain web browsers within the rendering engine.

In an example, a web browser that is local to an endpoint device may receive input from the user requesting to run untrusted code. The web browser may send the request to a browser rendering engine system, which may then retrieve the untrusted code from the Internet. Additionally, the browser rendering engine system may run the untrusted code at a rendering engine at the browser rendering engine system. In particular, the rendering engine may be run within a container at the browser rendering engine system. Once content, such as untrusted code, is run on a remote rendering engine at the browser rendering engine server, the output of the rendering engine may be sent from the browser rendering engine server to the endpoint device and viewed using a web browser. In this way, the web browser that is running on the endpoint device may be operably coupled with the output of the remote rendering engine.

Figure 1:
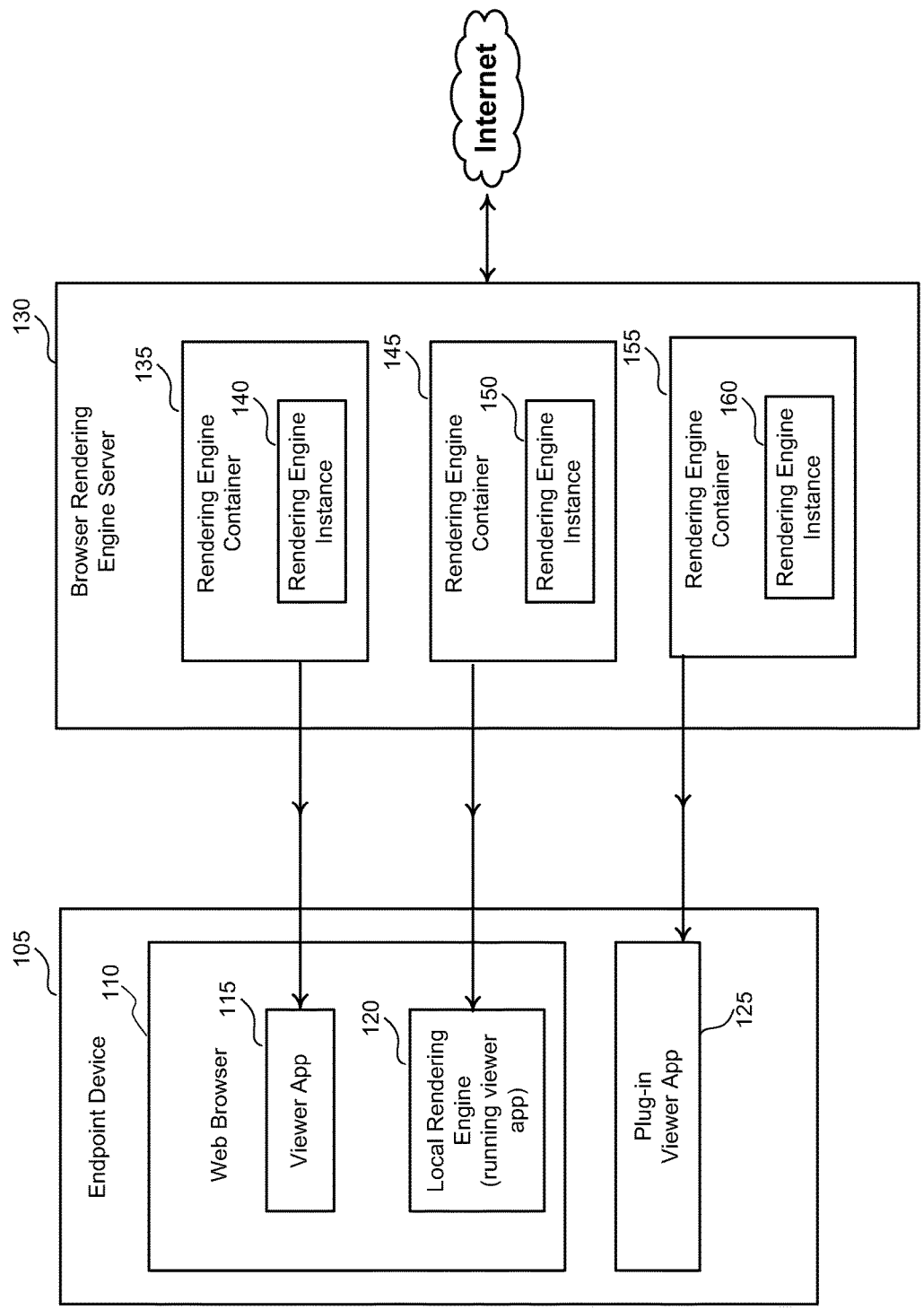
FIG. 1 illustrates an endpoint device having multiple viewer applications, in accordance with embodiments of the invention.

In some examples, the output that is received from the rendering engine may be run on a viewer application that is built into a web browser of an endpoint device. This is seen in FIG. 1, which illustrates an endpoint device having multiple viewer applications, in accordance with embodiments of the invention. In particular, FIG. 1 shows an endpoint device 105 having a web browser 110 that includes a viewer application 115. The web browser on the local computer could be a viewer application that does not contain a web rendering engine, but connects to and transmits the output of the rendering engine and user input to the rendering engine. Alternatively, the web browser on the endpoint device may comprise a full web browser with its own local rendering engine 120, such as Google's Chrome or Microsoft's Internet Explorer. The local rendering ending 120 may also be used to run a viewer application, such as a JavaScript and HTML5 application, that connects to a remote rendering engine, displays a remote rendering engine's output, and send user input to a remote rendering engine. Additionally, in some examples a remote rendering engine may be run on a hardened Linux virtual machine so as to minimize a possibility of malicious code running on the rendering engine.

A viewer application may be intentionally installed by a user of the endpoint device. For example, a user may download a plug-in viewer application 125 to endpoint device 105. Alternatively, the viewer application may be installed using an intercepting web proxy. For example, a viewer application may be installed transparently as a user browses through the Internet through your traditional browser. When a request for web content is provided from the user, the request may be intercepted by a network proxy, which in turn may transparently install the viewer in HTML 5 or JavaScript. In this way, the viewer application may not require the user to initiate application installation, since the software for the viewer application may run in the browser.

As also seen in FIG. 1, endpoint device 105 may interact with a browser rendering engine server 130 so as to provide web content to viewer applications 115, 120, and 125. Browser rendering engine server 130 may include a number of rendering engine containers 135, 145, and 155. Each rendering engine container may be a virtual machine or an application container. Additionally, each rendering engine container may include one or more rendering engine instances such as rendering engine instances 140, 150, and 160. Output from each rendering engine instance may then be provided to a viewer application on the endpoint device. Accordingly, the output from a rendering engine may be run on a viewer application 115 on a web browser. The output from a rendering engine may also be run on a local rendering engine 120 within the web browser 110 which, in turn, may run a viewer application. Additionally or alternatively, the output may be run by a viewer plug-in application 125 on the endpoint device 105.

Figure 2:
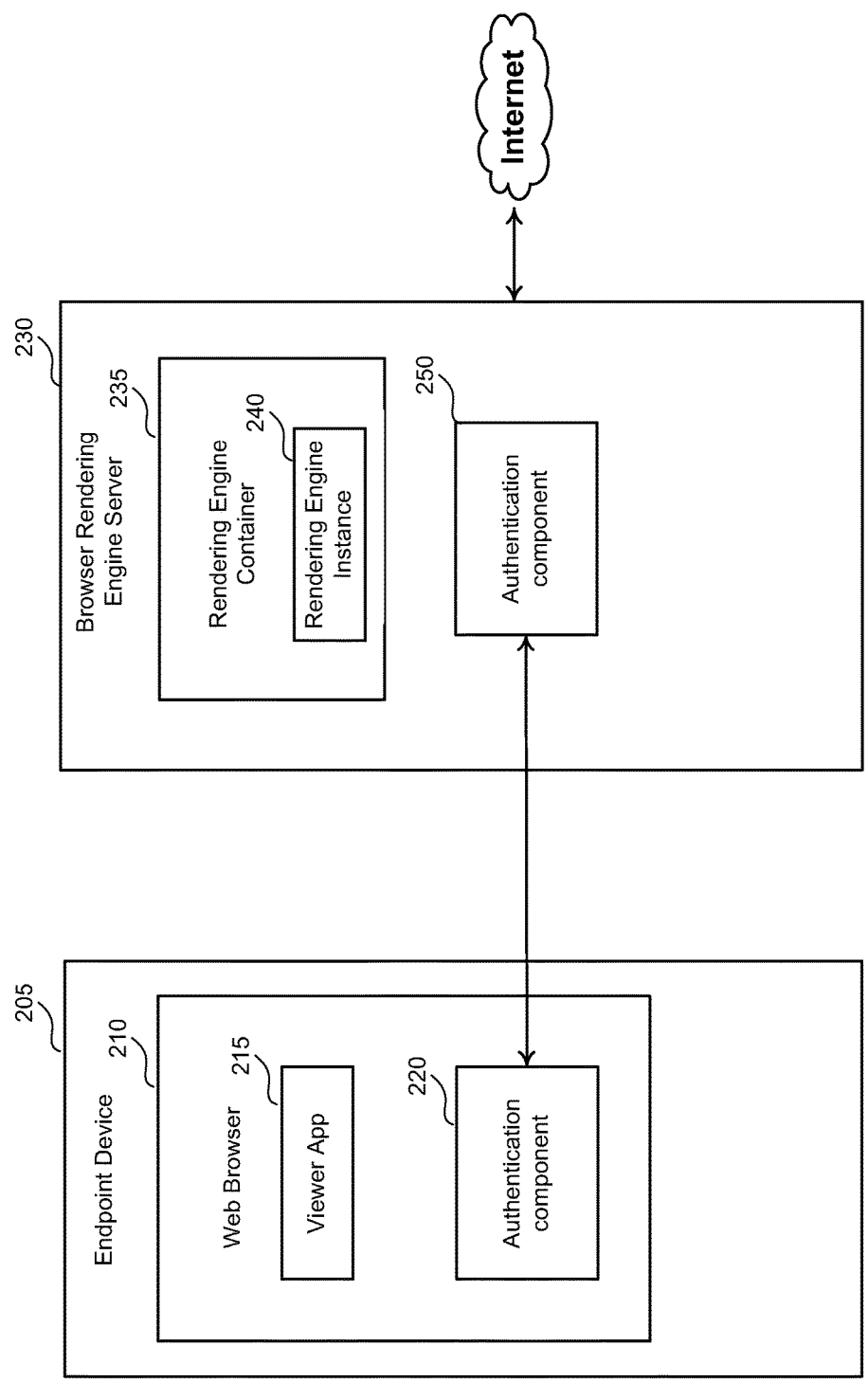
FIG. 2 illustrates a web browser of an endpoint device having an authentication component that interacts with an authentication component of a browser rendering engine server, in accordance with embodiments of the invention.

Once a viewer application has been installed on the endpoint device and/or within a local web browser of the endpoint device, an optional authentication component may also be provided in association with the decoupling rendering engine system. This is shown at FIG. 2, which illustrates a web browser of an endpoint device having an authentication component that interacts with an authentication component of a browser rendering engine server, in accordance with embodiments of the invention. In particular, FIG. 2 provides an endpoint device 205 having a web browser 210 that includes a viewer application 215 and an authentication component 220. FIG. 2 also provides a browser rendering engine server 230 having a rendering engine container 235 and an authentication component 250. Accordingly, an authentication component 220 may be used to provide user identity information which may then be used to authenticate user activity on the remote rendering engine 240 that runs software within rendering engine container 235. For example, a user may provide profile information, cookies, and/or saved passwords to an authentication component 250 of the browser rendering engine server 230. The browser rendering engine server 230 may then provide the user information to a rendering engine 240 within a rendering engine container 235. Using rendering engine 240, a user may access a banking website using a saved password.

Accordingly, the user may access their banking data using a secure rendering engine 240 within a rendering engine container 235. Additionally, content rendered at rendering engine 240 may be provided to the user using an encrypted data channel between rendering engine 240 and a viewing application on endpoint device 205.

Additionally, a user may provide other information to a browser rendering engine server. For example, a user may provide user information having associated metadata, such as saved user profile data and metadata. This user information may be used at the browser rendering engine server to make a browser experience more consistent across websites that are rendered using the browser rendering engine server. This is shown in FIG. 3, which illustrates a decoupled rendering engine system 300 having an endpoint device 305 and a browser rendering engine server 330 having a virtual machine 335 and an application container 345, in accordance with embodiments of the invention.

Figure 3:
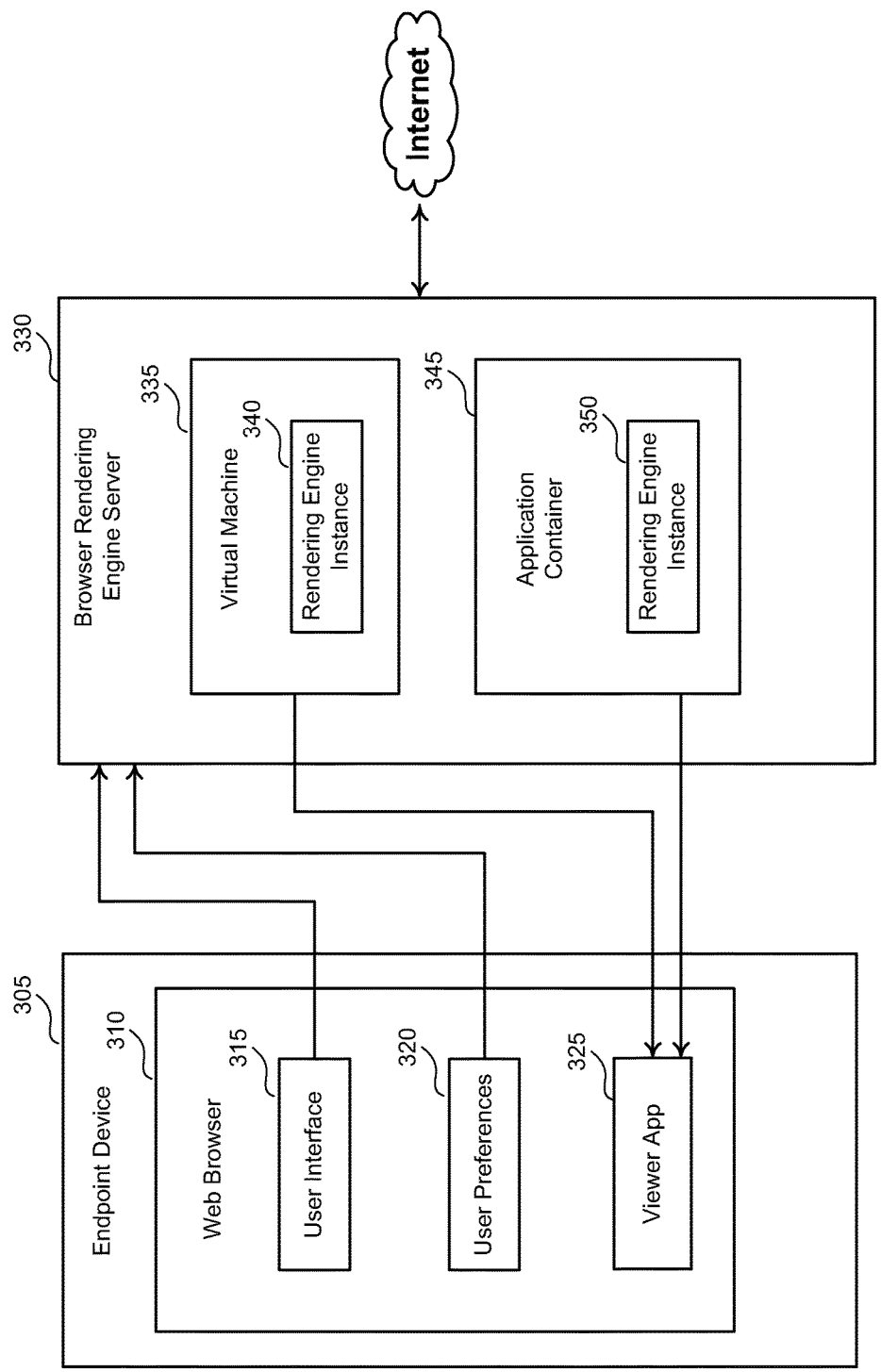
FIG. 3 illustrates a decoupled rendering engine system having an endpoint device and a browser rendering engine server having a virtual machine and an application container, in accordance with embodiments of the invention.

As seen in FIG. 3, endpoint device 305 includes a web browser 310 having a user interface 315, user preferences 320, and a viewer application 325. As such, one or more components of a user interface 315 of a web browser 310 may be stored on an endpoint device 305. Components of user interface 315 may include an address bar, a forward button, a back button, tabs, scrollbars, menu items, URL bar, stop/reload buttons, bookmark buttons, and similar elements. Additionally, user input may be received at user interface 315. The user input received at user interface 315 may then be provided to a browser rendering engine server, such as browser rendering engine server 330. Similarly, user preferences 320 may be stored at web browser 310 on electronic device 305. Furthermore, one or more user preferences 320 may be provided to a browser rendering engine server 330 from endpoint device 305.

Based on user inputs from user interface 315 and user preferences 320, content may be rendered at browser rendering engine server 330. The output of browser rendering engine server 330 may then be provided to a viewer application 325 on the web browser 310. In examples, content that is output may include image content, audio content, video content, and other forms of content data. Additionally, the content that is provided to viewer application 325 may be encrypted and/or digitally distilled, as discussed further below. Accordingly, examples of content include static images such as two-dimensional graphic files, dynamic content such as video content, and other forms of web content. Further, in examples, content may be compressed or uncompressed.

FIG. 3 also includes a browser rendering engine server 330 having a virtual machine 335 and an application container 345. Both virtual machine 335 and application container 345 contain a rendering engine 340 and 350, respectively. A virtual machine 335 may be used to contain a rendering engine 340 when a user prefers to run an application, or series of applications, using a full operating system. Alternatively, an application container 345 may be used to contain a rendering engine 350 when a user prefers to open an application in a more closed, secure environment. In particular, an application container 345 may be used when a user prefers to create a new environment for the processing of new tasks so that malware associates with individual tasks does not affect other, related tasks. As such, the use of virtual machine 335 and application container 345 may have different performance and security considerations that may be factors considered by the user when choosing an appropriate container for a remote rendering engine.

Additionally, a user may benefit from rendering web browser content in a container that is configured to run content within a given web browser. In particular, configuring a rendering engine based on given web browser settings may confer a website compatibility benefit. In examples, different web browsers (e.g., Safari, Firefox, and Chrome) may have different capabilities with respect to how they render particular websites, such as Facebook or Pandora. Each browser may have minor differences between how they render content. As such, it is beneficial to run web browser content in a rendering engine configured to a given web browser so as to ensure that customers get a web-browsing experience that is optimized.

Figure 4:
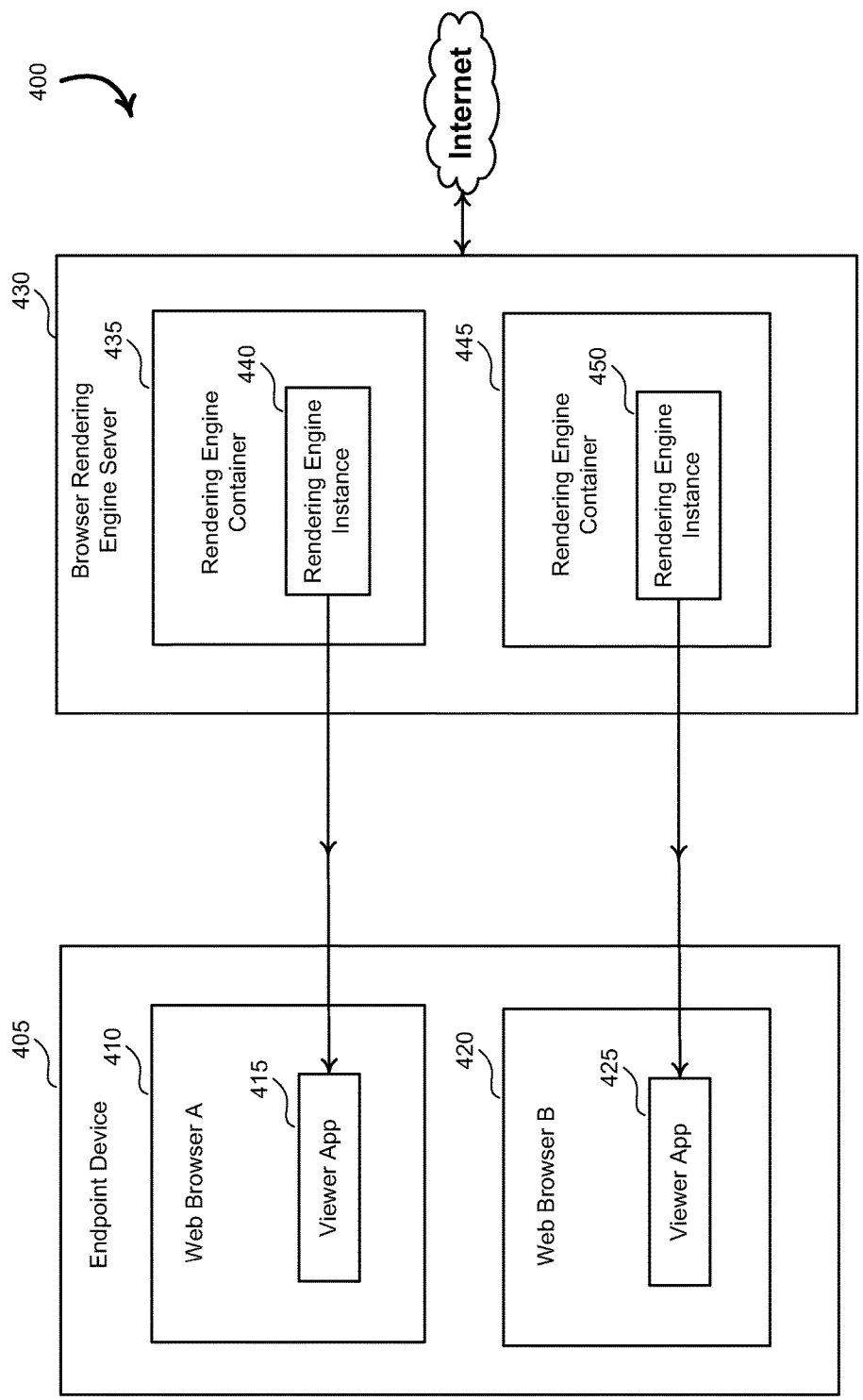
FIG. 4 illustrates a decoupled rendering engine system having an endpoint device with two web browsers and a browser rendering engine server having two rendering engine containers, in accordance with embodiments of the invention.

Accordingly, FIG. 4 illustrates a decoupled rendering engine system 400 having an endpoint device 405 with two web browsers 410, 420 and a browser rendering engine server 430 having two rendering engine containers 435, 445, in accordance with embodiments of the invention. As seen in FIG. 4, content that is rendered using Rendering Engine Instance 440 within Rendering Engine Container 435 may be provided to a viewer application 415 within web browser A 410. Similarly, content that is rendered using rendering engine 450 within rendering engine container 445 may be provided to a viewer application 425 within web browser B 420. In an example, web browser A 410 may be a Google Chrome browser, whereas web browser B 420 may be a Microsoft Internet Explorer web browser. As such, rendering engine 440 may be configured to render content consistent with the characteristics of a Google Chrome browser. The output from rendering engine 440 may then be provided to viewing application 415 within web browser A 410, which is a Google Chrome browser. Similarly, the output from rendering engine 450 may then be provided to viewing application 425 within web browser B 420, which is a Microsoft Internet Explorer web browser. In this way, content rendered in rendering engines 435, 445 may be optimized for web browser compatibility.

In additional examples, separate rendering engines may be provided for one or more tabs within a web browser. This separation of rendering content may be used to increase security of information within the one or more web browser tabs. For example, a common way of attacking a user's system may be to infect a memory space of a browser when a user visits a bad website from the web browser. Even if a user has a separate tab for a subsequent website visit, the content in the tabs may only be separated by threads, so that the browser running subsequent tabs may still be running on the same memory space which has already been corrupted by malware. In this way, a user who has a browser infected with malware may have the malware infect subsequent transactions, such as visiting a banking website. For this reason, even if a browser is run in a secure environment, there are benefits to running sensitive software on a per-tab basis even within a browser.

Figure 5:
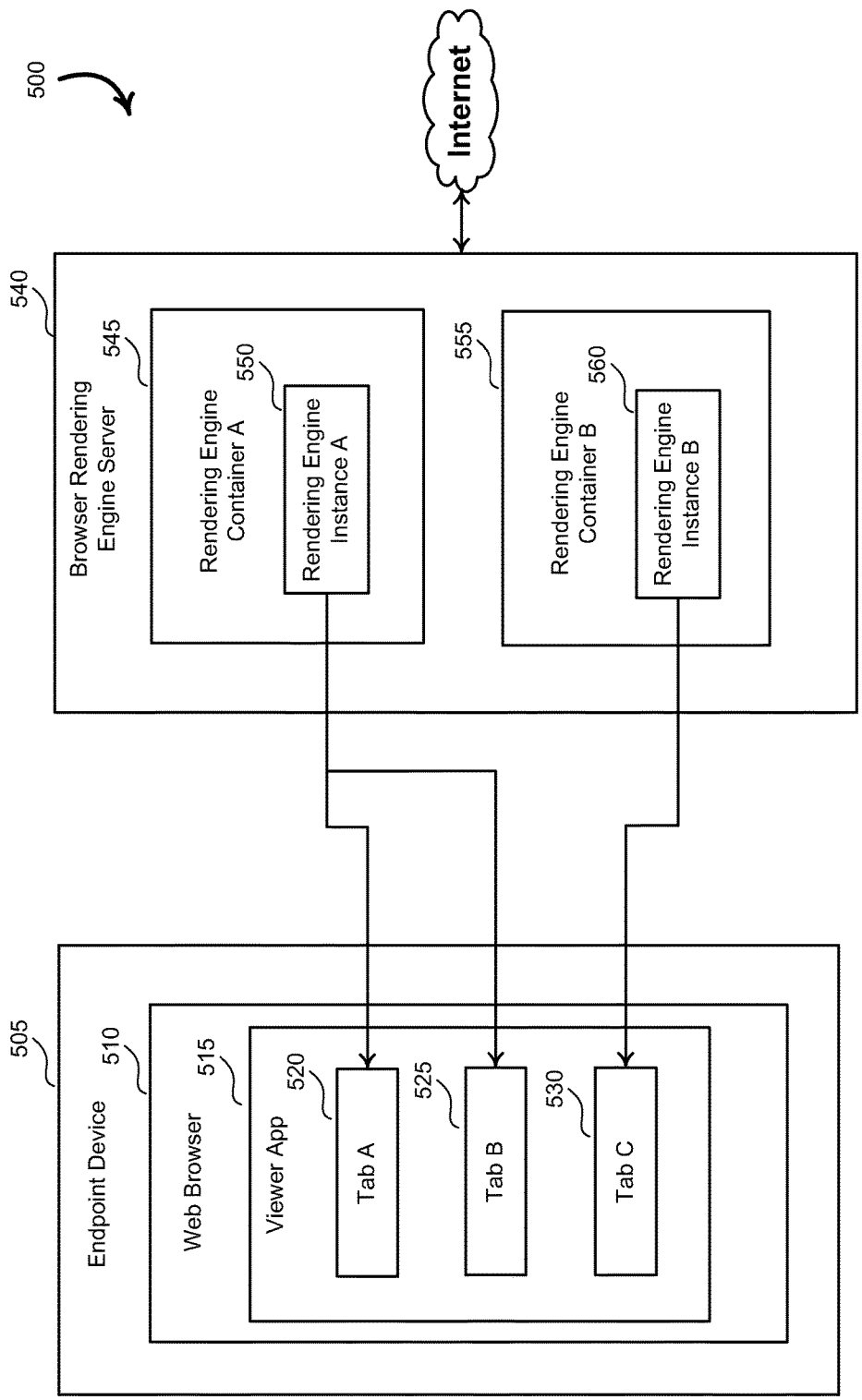
FIG. 5 illustrates a decoupled rendering engine system having an endpoint device with a web browser having a viewer application with multiple tabs and a browser rendering engine server having two rendering engine containers, in accordance with embodiments of the invention.

So then the running malware is able to do something even if you're in a separate tab for say a banking website. So we have a very secure environment, but you can still have the worry of the malware running in the browser, and if it gets in the browser it may be able to spread to anything else in a container that is running the website, so it's beneficial to have a separated container for a tab. Accordingly, FIG. 5 illustrates a decoupled rendering engine system 500 having an endpoint device 505 with a web browser 510 having a viewer application 515 with multiple tabs 520, 525, 530 and a browser rendering engine server 540 having two rendering engine containers 545, 555, in accordance with embodiments of the invention. As seen in FIG. 5, content associated with tabs 520, 525 is rendered by rendering engine 550 within rendering engine container 545. Additionally, content associated with tab 530 is rendered by rendering engine 560 within rendering engine container 555.

In additional examples, a browser rendering engine server may server more than one endpoint device. In some examples, a browser rendering engine server may have multiple rendering engines that are each associated with a distinct endpoint device. Additionally, each endpoint device may have multiple rendering engine containers within a browser rendering engine server. For example, each endpoint device may have one container on the browser rendering engine server associated with each web browser that is being run on the endpoint device.

Figure 6:
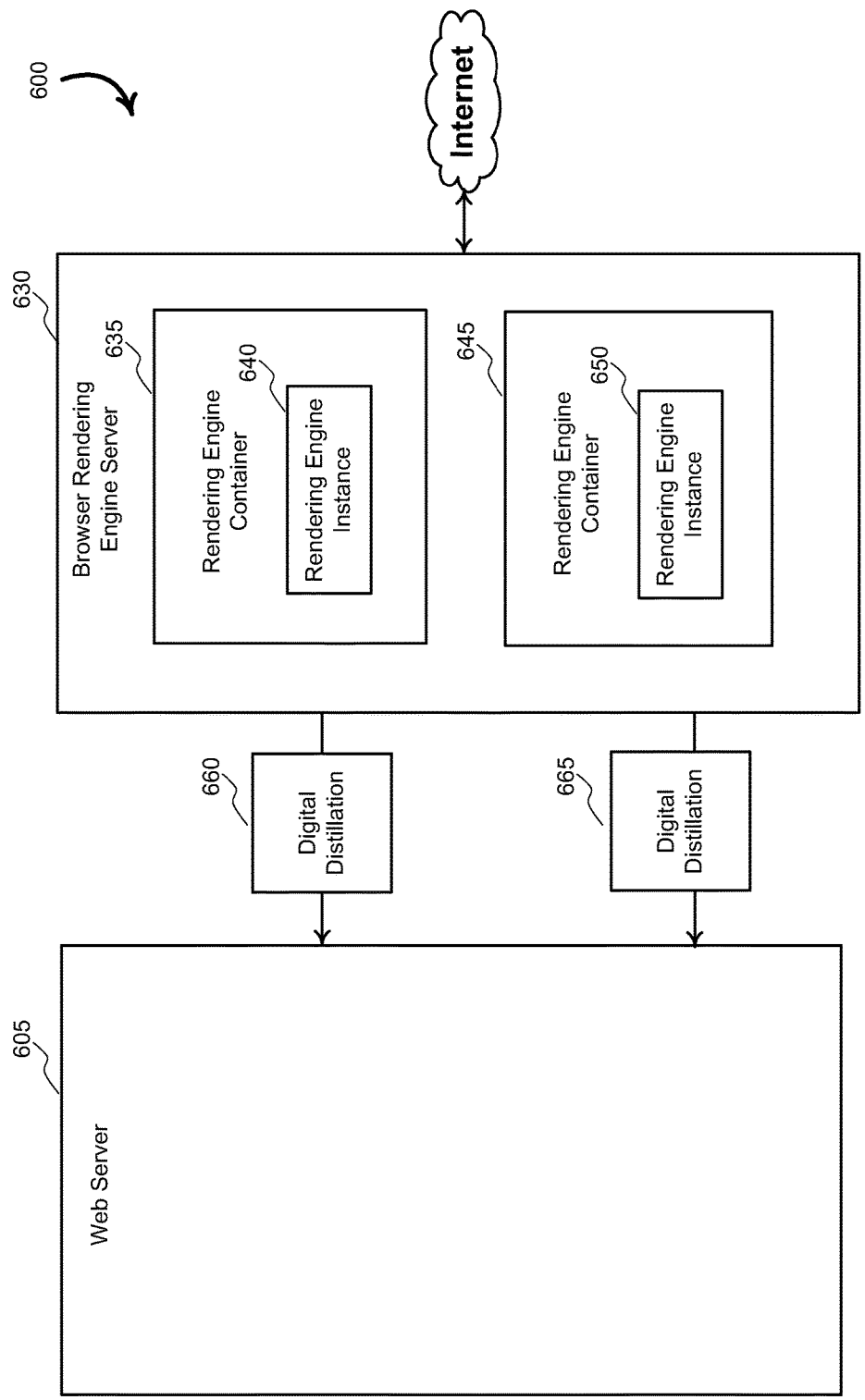
FIG. 6 illustrates a decoupled rendering engine system having a web server and a browser rendering engine system, in accordance with embodiments of the invention.

In addition to network configurations discussed above, additional network architectures may be used to implement a decoupling rendering system. For example, another example of an endpoint device may be on the public Internet. This is provided in FIG. 6, which illustrates a decoupled rendering engine system 600 having a web server 605 and a browser rendering engine server 630, in accordance with embodiments of the invention. As seen in FIG. 6, a browser rendering engine server 630 receives a content request from a web server 605. In examples, browser rendering engine server 630 may request the content from the Internet, and may then render the requested content at rendering engine instances 640, 650 within rendering engine containers 635, 645, respectively. Additionally, as seen in FIG. 6, content that is rendered using remote rendering engines 640, 650 may be digitally distilled prior to providing the content to web server 605. In particular, output from rendering engines 640, 650 may be digitally distilled using digital distillation components 660, 665, respectively.

Computer Control Systems

Figure 7:
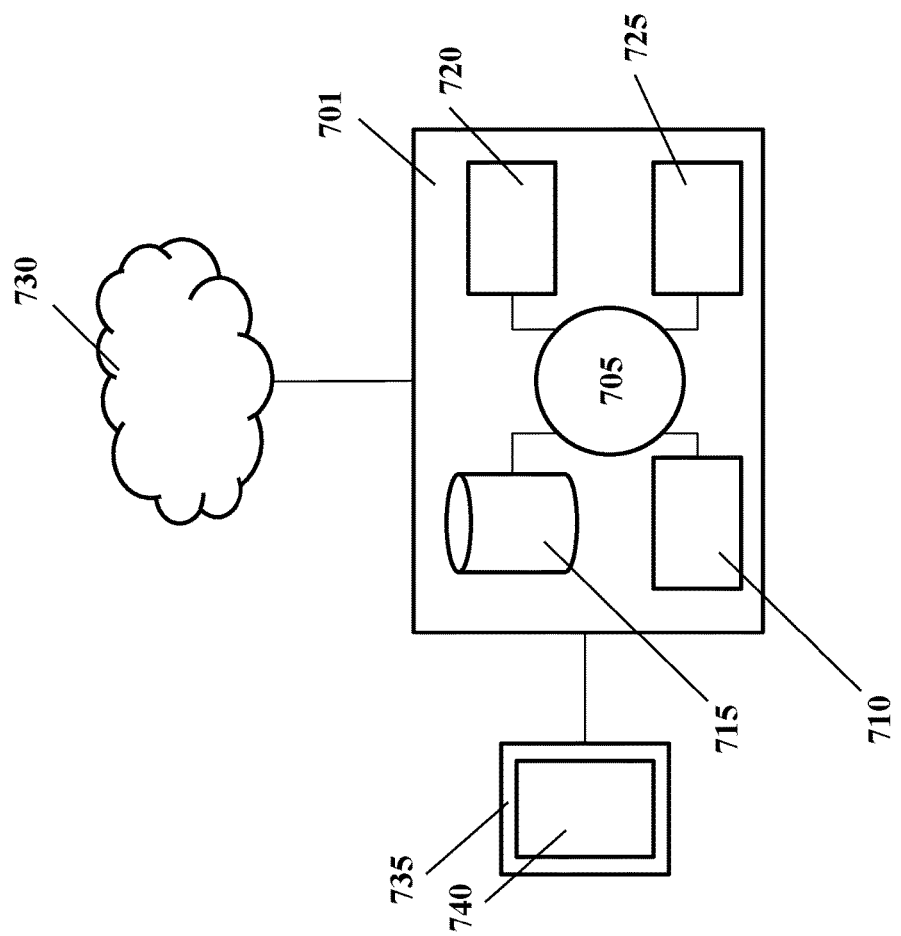
FIG. 7 illustrates a computer system control system that is programmed or otherwise configured to implement methods provided herein.

The present disclosure provides computer control systems that are programmed to implement methods of the disclosure. FIG. 7 shows a computer system 701 that is programmed or otherwise configured to decouple rendering of browser content. The computer system 701 can regulate various aspects of decoupling rendering of browser content within the present disclosure, such as, for example, installing viewer applications, requesting web content, retrieving web content, rendering web content at a rendering engine separate from an endpoint device, and providing requested web content to the endpoint device. The computer system 701 can be an electronic device of a user or a computer system that is remotely located with respect to the electronic device. The electronic device can be a mobile electronic device.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user (e.g., a browser rendering engine server). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 730.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 735 that comprises a user interface (UI) 740. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 705. The algorithm can, for example, determine that a content for web content originates from a particular web browser and render the requested web content using a remote rendering engine that is configured based on the web browser.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for providing web content containing potential malware from a decoupled rendering engine to a visual display of an electronic device of a user, comprising:
   receiving, at a browser rendering engine server, a request for web browser content containing potential malware from a local web browser of an electronic device of a user, wherein the browser rendering engine server is physically separate from the electronic device of the user;
   retrieving the requested web content;
   providing the requested web content to a rendering engine that is isolated within a secured rendering engine container stored on the browser rendering engine server;
   rendering the web content at the rendering engine, thereby generating web content output from the rendering engine in the absence of potential malware, the web content output comprising image, audio, or video data that need not be further rendered on the electronic device of the user; and
   providing the web content output without potential malware to the viewing application on the electronic device of the user, wherein the viewing application securely displays the web content on a display of the electronic device of the user.

2. The method of claim 1, wherein the viewing application runs within the local web browser of the electronic device.

3. The method of claim 1, wherein the viewing application runs within a plug-in viewing application that is stored on the electronic device.

4. The method of claim 1, further comprising:
   receiving, at the browser rendering engine server, a second request for web browser content from a local web browser of an electronic device of a user, wherein the second request for web browser content is associated with a distinct tab within the local web browser;
   retrieving the requested web content;
   providing the requested web content to a second rendering engine that is isolated within a second rendering engine container stored on the browser rendering engine server;
   rendering the web content at the second rendering engine, thereby generating web content output from the second rendering engine; and providing the web content output from the second rendering engine to the viewing application on the electronic device of the user, wherein the viewing application displays the web content from the second rendering engine on the display of the electronic device of the user.

\* \* \* \* \*